UNITED STATES PATENT OFFICE.

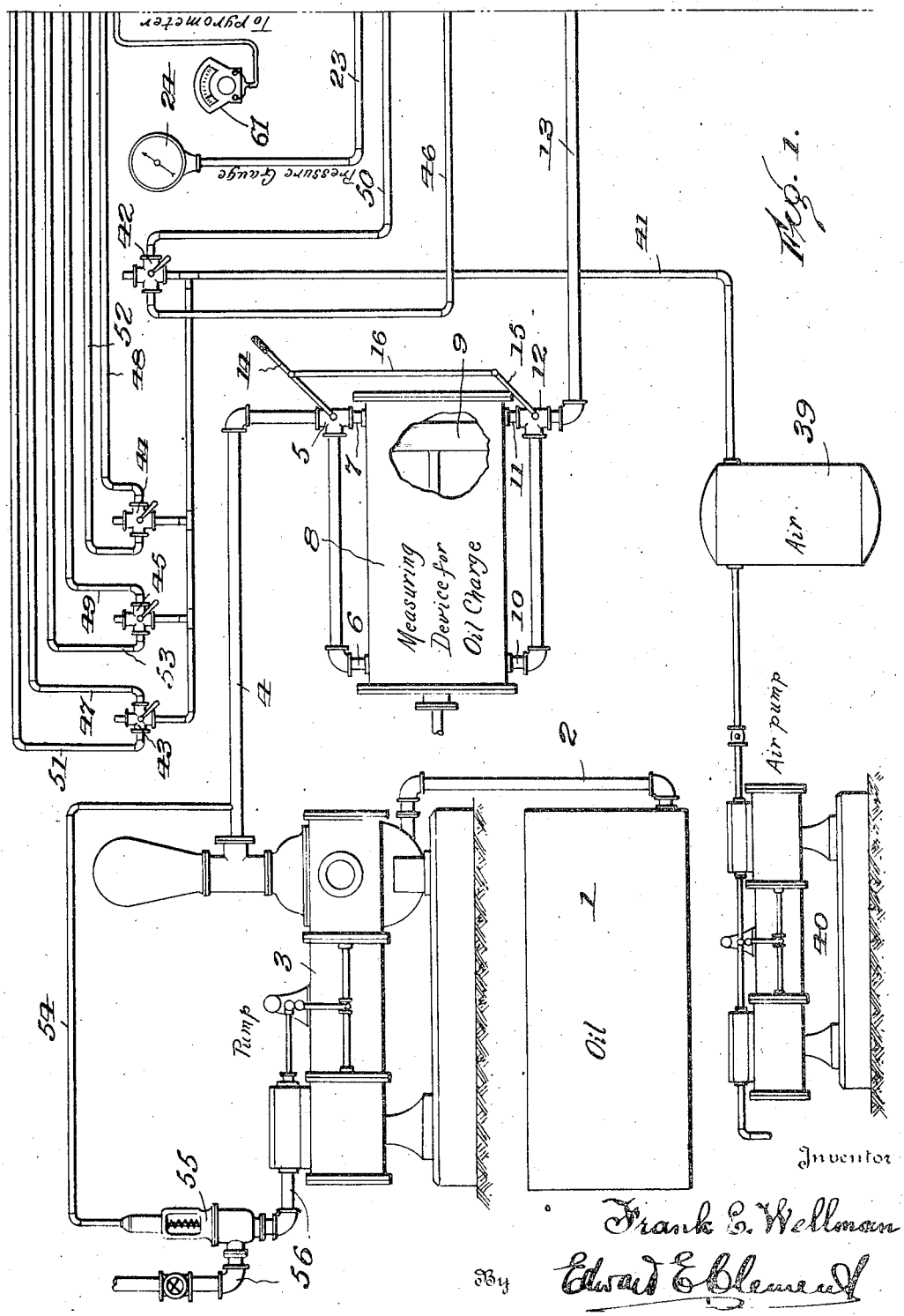

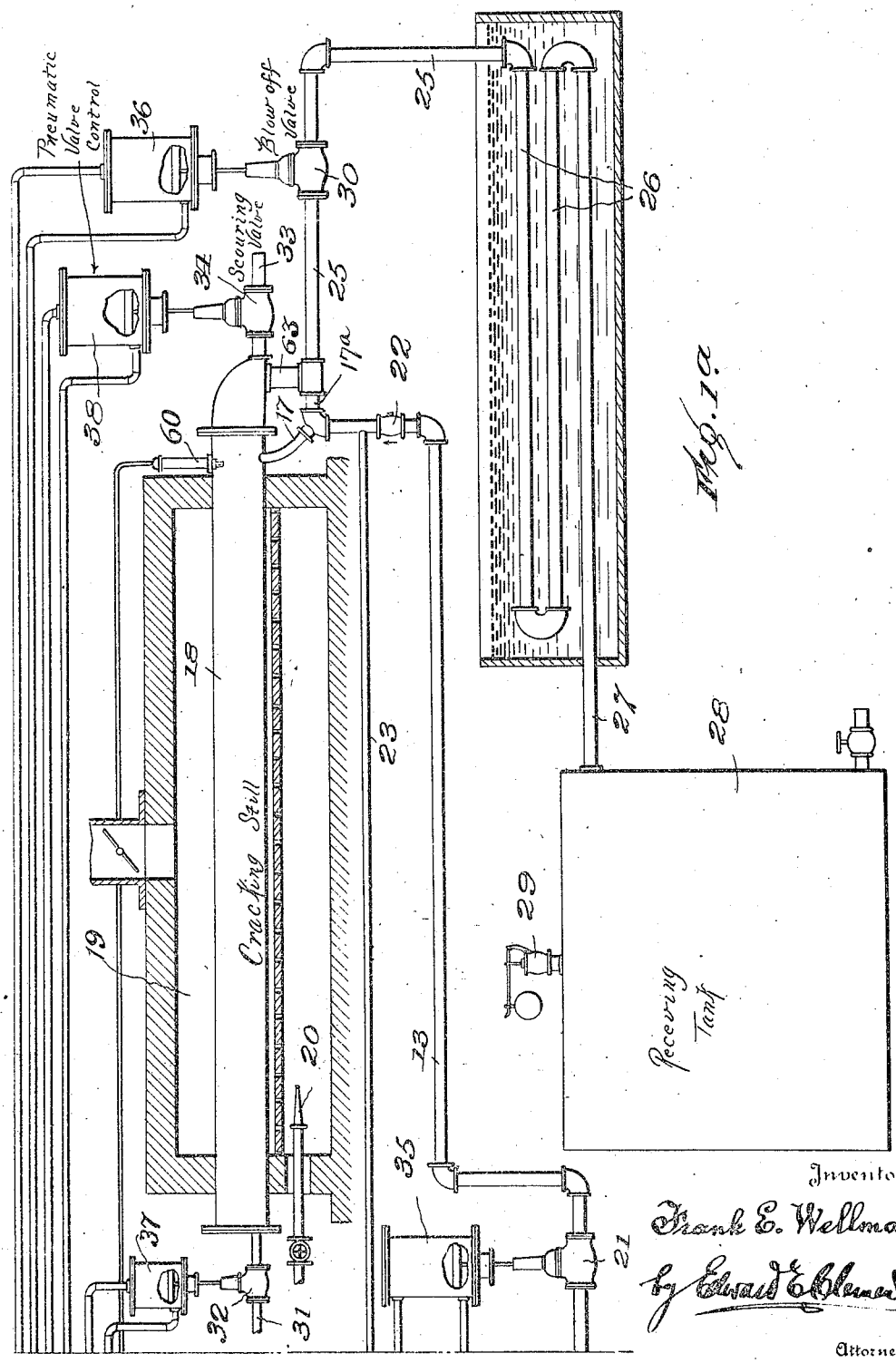

FRANK E. WELLMAN, OF KANSAS CITY, KANSAS, ASSIGNOR TO THE KANSAS CITY GASOLINE COMPANY, OF KANSAS CITY, KANSAS, A CORPORATION OF KANSAS.

APPARATUS FOR REFINING OIL.

1,335,772.  Specification of Letters Patent.  Patented Apr. 6, 1920.

Application filed May 12, 1917. Serial No. 168,223.

*To all whom it may concern:*

Be it known that I, FRANK E. WELLMAN, a citizen of the United States, residing at Kansas City, Wyandotte county, State of Kansas, have invented certain new and useful Improvements in Apparatus for Refining Oil, of which the following is a specification, reference being had therein to the accompanying drawing.

My invention relates to apparatus for refining oil, and has for its object in particular the improvement of existing apparatus.

The leading and characteristic features of my present invention are as follows: (1) The use of a tubular retort operating intermittently upon measured charges; (2) discharging and condensing each charge after cracking for a determinate period and at a determinate temperature and pressure; (3) scouring out and cleaning the retort after each operation; (4) automatic control of heat, pressure, charging, and discharging, preferably from a distance; (5) cracking in a horizontal tubular retort containing a fractional charge, so as to leave a vapor space for the maintenance and retention of the lightest products or fixed gases during each operation, whereby the quality and the percentage of converted product are raised.

My invention is illustrated in the accompanying drawings in which—

Figure 1 is a diagrammatic view of a portion of the apparatus used in my process.

Fig. 1ª is a continuation of Fig. 1 showing the remaining portion of my apparatus.

The portion of the apparatus shown in Fig. 1 consists mainly of the supply and control apparatus, while that portion shown in Fig. 1ª consists mainly of the operating apparatus which in the interests of safety is situated more or less remotely from the control apparatus shown in Fig. 1.

Referring to the drawings in detail, 1 indicates the supply or storage tank for containing material to be treated, which tank is connected through a pipe 2 to the inlet end of a force pump 3, the outlet of which pump connects through a pipe 4, three-way cock 5, and inlet pipes 6 and 7 to opposite ends of a measuring cylinder 8. This measuring cylinder is provided with a free piston 9 and is so proportioned as to hold a predetermined volume of the oil to be cracked. The lower ends of the measuring cylinder 8 are provided with discharge pipes 10 and 11 which connect through a three-way cock 12 to the still-charging pipe line 13. The three-way cocks 5 and 12 are controlled by suitable levers 14 and 15 respectively, the master lever 14 being connected to the lever 15 by means of a suitable link connection 16 or otherwise so that both levers may be operated simultaneously, the three-way cocks 5 and 12 being so set that the pipe line 13 will be connected with the right-hand side of the cylinder 8 when the pipe 4 is connected with the left-hand side of the cylinder and vice versa. The pipe line 13 connects through a common inlet and discharge pipe 17 with the retort or cracking tube 18 which is mounted in a suitable furnace 19 provided with a suitable source of heat as indicated at 20. A block valve 21 is included in the pipe line 13 between the measuring cylinder 8 and the cracking tube 18, and between this block valve and the common pipe 17 is connected a check valve 22 set to permit the flow of oil in the direction indicated by the arrow. A pressure gage line 23 connects with the pipe line 13 between the check valve and the cracking tube and extends therefrom to the control station where it terminates in a suitable pressure gage 24. A discharge line 25 connects with the still 18 through the common inlet and discharge pipe 17 and leads therefrom to a cooling coil or condenser 26 which discharges through a pipe 27 into a receiving tank 28, the receiving tank being provided with a suitable relief valve such as 29. A block valve 30 is connected in the discharge line 25 between the cracking coil and cooling coil.

For the purpose of cleaning out the cracking tube between charges, I provide a novel arrangement which consists of a steam supply pipe 31, connected at the left-hand end of the cracking tube and through which the passage of steam is controlled by the block valve 32. The right-hand end of the tube is adapted to be connected with atmosphere through the pipe 33, containing block valve 34. The block valves 21, 30, 32 and 34 are actuated by pneumatic piston cylinders 35, 36, 37, and 38 respectively, operated by compressed air supplied from a reservoir 39 situated at the control station. The reservoir 39 is kept charged by a suitable compressor 40 and is connected through the supply pipe 41 and four-way cocks 42, 43, 44 and 45 to the piston cylinders 35, 36, 37, and 38 respectively, one of the side openings of each of the four-way cocks connecting through pipes 46, 47, 48 and 49 to the bottom ends of the piston cylinders 35, 36, 37 and 38 respectively, and the other side openings leading through pipes 50, 51, 52 and 53 to the upper ends of the piston cylinders 35, 36, 37 and 38 respectively. The upper openings of the four-way cocks communicate with the atmosphere and the core of each cock is so adjusted that when its lever is thrown into the position indicated in Fig. 1, the upper end of its associated piston cylinder will be connected with the compressed air supply and the lower end with the atmosphere, the reverse condition obtaining when the lever is thrown to the left. The force pump 3 is arranged to automatically maintain a constant pressure in the pipe 4 by means of a branch connection 54 connecting the pipe 4 with a diaphragm valve 55 arranged to be actuated upon the increase of pressure to close the steam supply 56 of the driving end of the pump, and to release upon a decrease of pressure so as to permit steam to pass to the driving end of the pump.

The operation is as follows:

Heat is applied to the furnace by the burner 20 until the tube 18 has been brought to a temperature somewhat above that required for the contents during cracking, preferably about 600° C., after which the lever of the four-way cock 42 is thrown to the left to connect the pipe 46 with the compressed air supply and the pipe 50 with atmosphere, thus permitting compressed air to enter the piston cylinder 35 from the bottom which raises the piston therein and opens the block valve 21 in the supply pipe 13. The master lever 14 is then swung downwardly which operates the three-way cocks 5 and 12 to connect the pump discharge pipe 4 to the right-hand end of the measuring cylinder. The pressure now being relieved from the pipe 4 and the branch pipe 54, the diaphragm valve 55 is released, permitting steam to flow through the steam supply pipe 56 of the force pump 3 which immediately begins to operate, forcing oil into the right-hand end of the measuring cylinder 8 through pipe 4, three-way cock 5 and inlet pipe 7, which forces the piston 9 over to the left and drives the charge already contained in the cylinder, between the piston and the left-hand end, out through discharge pipe 10, three-way cock 12, supply pipe 13, valves 21 and 22, pipe 17 into the cracking tube 18. When the piston 9 reaches the left-hand end of the measuring tank, the flow of oil from the pump is stopped, thus raising the pressure in the pipes 4 and 54 which again operates the diaphragm valve 55 to shut off the steam supply through 56, thus stopping the force pump. The cracking tube is charged to a fraction of its volume capacity, the measuring cylinder 8 being suitably proportioned.

When the pressure in the tube has reached 700 to 800 pounds to the square inch, as will be indicated by the pressure gage 24 at the control station, the lever of the four-way cock 43 is thrown to the left, causing the piston cylinder 36 to operate to open the valve 30, permitting the contents of the cracking tube to be blown out through the pipe 63, discharge pipe 25, cooling coil 26 into receiving tank 28. The levers of the four-way cocks 45 and 44 are now thrown over to the left, causing their associated piston cylinders 38 and 37 to be operated to open the valves 34 and 32 respectively, which permits superheated steam under pressure to be blown through the pipe 31 into the cracking tube and out by way of 33 to the atmosphere, which scours and cleans the cracking tube of the carbon formed during cracking of the last charge. I have found in practice that where the cooling coil is of sufficient size and comparatively free of sharp bends, the branch connection 33 to atmosphere and its associated valve control may be done away with as under such conditions the flow of steam will not be unduly restricted or cut down and will pass through the cracking tube swiftly enough to clean it of any deposit that might have formed during the cracking of the last charge.

I have shown a pyrometer at 60, in Fig. 1ª, with electrical circuit wires leading to the indicator dial 61 in Fig. 1. The two dials of the pyrometer and the pressure gage 24 are, of course, located at or near the switchboard containing the various levers of the cocks 42, 43, 44 and 45, and the controlling lever 14. The heat in the retort is supposed to be maintained constant, at a temperature predetermined for each grade of oil and according to the product desired. Similarly, the pressure is predetermined and regulated by means of the valves 32, 30 and 34. An ordinary stillman can handle the apparatus with ease, working from a table of temperatures and pressures and times of heat, which can be accurately worked out for each product and for each grade of oil desired. Where I use the word "product," it is of course to be understood that I include in this a more or less expanded range of hydrocarbon series.

Having thus described my invention, what I claim and desire to secure by Letters Patent is:

1. Apparatus of the class described, comprising the following instrumentalities: a tubular retort, means for heating the same, inlet and discharge pipes for the same at opposite ends thereof, said discharge pipe communicating with the interior of the retort at the level of the bottom thereof, valves controlling said devices respectively, means for feeding charges through the inlet pipe to the retort intermittently, and means for scouring out the bottom and sides of the retort in the intervals between discharging and charging.

2. Apparatus of the class descrbed, comprising the following instrumentalities: a tubular retort, means for heating the same, inlet and discharge pipes for the same at opposite ends thereof, said discharge pipe communicating with the interior of the retort at the level of the bottom thereof, valves controlling said devices respectively, means for feeding charges through the inlet pipe to the retort intermittently, and means for supplying superheated steam, under pressure, to the retort at the end opposite the discharge pipe in the intervals between discharging and charging, to scour all residue from the bottom and sides of the retort.

3. Apparatus of the class described, comprising the following instrumentalities: a retort, means for heating the same, a feed pipe, means for forcing measured charges into the retort through the feed pipe, a pipe leading to cooling apparatus, means for discharging the retort into said pipe, and a second discharge pipe communicating with the interior of the retort at the level of the bottom thereof, with means for scouring the retort and means for directing the scouring blast and material carried thereby through said second discharge pipe.

In testimony whereof I affix my signature.

FRANK E. WELLMAN.